United States Patent
Schmidt et al.

(10) Patent No.: US 11,757,280 B2
(45) Date of Patent: Sep. 12, 2023

(54) DC CURRENT DAMPER FOR A MEDIUM VOLTAGE OR HIGH VOLTAGE TRANSFORMER

(71) Applicant: Hitachi Energy Switzerland AG, Baden (CH)

(72) Inventors: Thomas Schmidt, Erpel (DE); Dietrich Bonmann, Meckenheim (DE)

(73) Assignee: Hitachi Energy Switzerland AG, Baden (CH)

( * ) Notice: Subject to any disclaimer, the term of this patent is extended or adjusted under 35 U.S.C. 154(b) by 21 days.

(21) Appl. No.: 17/611,947

(22) PCT Filed: May 12, 2020

(86) PCT No.: PCT/EP2020/063174
§ 371 (c)(1),
(2) Date: Nov. 17, 2021

(87) PCT Pub. No.: WO2020/234044
PCT Pub. Date: Nov. 26, 2020

(65) Prior Publication Data
US 2022/0255315 A1  Aug. 11, 2022

(30) Foreign Application Priority Data
May 17, 2019 (EP) .................................. 19175085

(51) Int. Cl.
*H02H 9/02* (2006.01)
(52) U.S. Cl.
CPC .................................... *H02H 9/02* (2013.01)

(58) Field of Classification Search
CPC . G01R 31/14; H02H 9/02; H02H 9/08; H02H 3/16; H02H 3/162; H02H 3/167; H02H 3/18
USPC ....................................................... 361/42–50
See application file for complete search history.

(56) References Cited

U.S. PATENT DOCUMENTS

| | | | | | |
|---|---|---|---|---|---|
| 3,771,020 | A | * | 11/1973 | Smith | H02H 3/347 361/48 |
| 4,011,483 | A | * | 3/1977 | Meadows | H02H 11/001 361/107 |
| 4,580,186 | A | * | 4/1986 | Parker | H02H 3/165 361/50 |

(Continued)

FOREIGN PATENT DOCUMENTS

| SU | 881 933 A1 | 11/1981 |
|---|---|---|
| WO | WO 2019/086058 A1 | 5/2019 |

OTHER PUBLICATIONS

International Search Report and Written Opinion of the International Searching Authority, PCT/EP2020/063174, dated Jul. 16, 2020, 12 pages.

(Continued)

*Primary Examiner* — Danny Nguyen
(74) *Attorney, Agent, or Firm* — SAGE PATENT GROUP

(57) ABSTRACT

Provided is a DC current damper for a medium voltage or high voltage transformer. The DC current damper includes at least one pair of diodes. The two diodes in each pair of diodes are in an anti-parallel configuration. The at least one pair of diodes is configured to be connected between a neutral connection of a medium voltage or high voltage transformer and ground potential.

18 Claims, 1 Drawing Sheet

(56) References Cited

U.S. PATENT DOCUMENTS

| | | | | |
|---|---|---|---|---|
| 7,852,591 B1 * | 12/2010 | Sutardja | ............... | G11B 5/40 |
| | | | | 360/323 |
| 2007/0103165 A1 | 5/2007 | Gaston et al. | | |
| 2008/0247197 A1 * | 10/2008 | Rivet | ............... | H03K 17/14 |
| | | | | 363/44 |

OTHER PUBLICATIONS

Hamberger, Dr. P., "New Method of Compensation of DC-Bias in Powertransformers," Siemens AG © 2017, Mar. 7, 2018, 25 pages.
Bachinger, F., et al., "Direct Current in Transformers: Effects and Compensation," Elektrotech. Inftech. (2013) Published Jan. 22, 2013, 5 pages.

* cited by examiner

DC CURRENT DAMPER FOR A MEDIUM VOLTAGE OR HIGH VOLTAGE TRANSFORMER

CROSS REFERENCE TO RELATED APPLICATIONS

This application is a 35 U.S.C. § 371 national stage application of PCT International Application No. PCT/EP2020/063174 filed on May 12, 2020, which in turns claims foreign priority to European Patent Application No. 19175085.0, filed on May 17, 2019, the disclosures and content of which are incorporated by reference herein in their entirety.

FIELD OF THE INVENTION

The present invention relates to a DC current damper for a medium or high voltage transformer, to a medium voltage or high voltage transformer having such a DC current damper, to a medium voltage or high voltage switchgear having such a DC current damper and/or transformer, and to a method of damping current with a DC current damper for a medium voltage or high voltage transformer.

BACKGROUND OF THE INVENTION

Transformers, reactors and other electrical devices used in electrical distribution and transmission networks typically have a neutral connection to ground and are affected by small and medium DC current. The sources of such currents are multiple. The DC current will run through the neutral of a transformer via the windings over headline or cable back through the windings and neutral to ground. Small DC currents in AC grids may increase due to power electronics application HVDC lines, etc., and may be in the range of a few 100 mA up to a few A. The cores of distribution and power transformers, reactors, etc., may be made of high permeable electrical steel in order to keep the losses to a low level. Such low loss transformers are, however, very sensitive to such small DC currents as the core will become pre-magnetized by the DC current. This can cause a higher induction in one half wave of the AC voltage induced in the core, also referred to as half cycle saturation. In addition to losses, this may also cause a much higher noise emitted by transformers and reactors.

Known mitigation measures include: increasing the core cross section or the introduction of air gaps in the core, which introduces cost and noise; and DC compensation, which can only be used in new transformers and adds cost to the transformer.

There is a need to address these issues.

SUMMARY OF THE INVENTION

Therefore, it would be advantageous to have an improved ability to mitigate the effects of small and medium DC currents in medium voltage and high voltage transformers, reactors and other electrical equipment.

The object of the present invention may be solved with the subject matter of the independent claims, wherein further embodiments are incorporated in the dependent claims.

In a first aspect, there is provided a DC current damper for a medium voltage or high voltage transformer, the DC current damper comprising:

at least one pair of diodes.

The two diodes in each pair of diodes are connected in an anti-parallel configuration.

The at least one pair of diodes is configured to be connected between a neutral connection of a medium voltage or high voltage transformer and ground potential.

In this manner, the DC Current Damper blocks DC current within a typical range needed, without affecting the grounding of the transformer.

In an example, the at least one pair of diodes is configured to block a DC voltage.

In an example, the at least one pair of diodes is configured to reduce or eliminate a DC current.

In an example, the DC current damper is configured to block a DC current in the range 100 mA—a few Amps.

In an example, the DC current damper is configured to block the DC current up to any one of: 2 A; 3 A; 5 A; 7 A; and 10 A.

In an example, the at least one pair of diodes comprises a plurality of pairs of diodes.

In an example, the plurality of pairs of diodes are cascaded.

In an example, the plurality of pairs of diodes are connected in series.

In an example, each pair of diodes is configured to have a threshold voltage of the order of 0.5-1.2V.

In an example, each pair of diodes is configured to have a threshold voltage of 0.8V.

In a second aspect, there is provided a medium voltage or high voltage transformer comprising a DC current damper according to the first aspect.

In a third aspect, there is provided a medium voltage or high voltage switchgear comprising a DC current damper according to the first aspect.

In a fourth aspect, there is provided a medium voltage or high voltage switchgear comprising a medium voltage or high voltage transformer according to the second aspect.

In a fifth aspect, there is provided a method of damping current with a DC current damper for a medium voltage or high voltage transformer. The DC current damper comprises at least one pair of diodes, wherein the two diodes in each pair of diodes are in an anti-parallel configuration. The method comprises connecting the at least one pair of diodes between a neutral connection of the medium voltage or high voltage transformer and ground potential.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
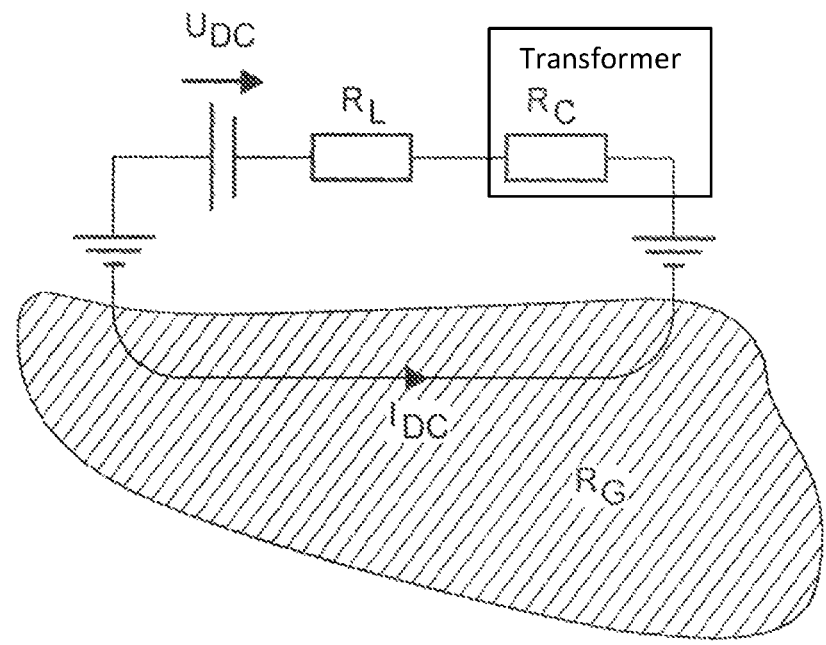
FIG. 1 shows a schematic representation of DC voltage and DC current flow associated with a medium voltage or high voltage transformer.

Minor DC-bias leads to a considerable increase of the noise level and to high reactive power consumption, as well as to a significant rise of no-load loss, in for example a transformer. Such a transformer can for example comprise a fluid insulated high voltage coil, with a closed tank for an insulation fluid and high voltage coils arranged therein, as well as dry-type high and medium voltage coils. Existing solutions to address this may have a negative effect on the grounding system and/or are complex, costly and can only be used with new transformers specifically design for such solutions.

The DC damper described here reduces the DC current and the consequential effects in medium voltage or high voltage equipment such as transformers and reactors. In an example, the DC current damper comprises at least one pair of diodes. The two diodes in each pair of diodes are connected in an anti-parallel configuration. The at least one pair of diodes is configured to be connected between a neutral connection of a medium voltage or high voltage transformer and ground potential.

According to an example, the at least one pair of diodes is configured to block a DC voltage.

According to an example, the at least one pair of diodes is configured to reduce or eliminate a DC current.

According to an example, the DC current damper is configured to block a DC current in the range 100 mA—a few Amps.

According to an example, the DC current damper is configured to block the DC current up to any one of: 2 A; 3 A; 5 A; 7 A; and 10 A.

According to an example, the at least one pair of diodes comprises a plurality of pairs of diodes.

According to an example, the plurality of pairs of diodes are cascaded.

According to an example, the plurality of pairs of diodes are connected in series.

According to an example, each pair of diodes is configured to have a threshold voltage of the order of 0.5-1.2V.

According to an example, each pair of diodes is configured to have a threshold voltage of 0.8V.

Thus, it is clear that a medium voltage or high voltage transformer can comprise such a DC current damper as described above, and as discussed that DC damper finds utility in other medium voltage or high voltage equipment, such as a reactor. This then serves to provide a wider solution for equipment such as a medium voltage or high voltage switchgear that has such a DC current damper and/or a switchgear having a transformer with such a DC current damper.

Thus, a mechanism of damping current with a DC current damper for a medium voltage or high voltage transformer utilizes the DC current damper that comprises at least one pair of diodes, wherein the two diodes in each pair of diodes are connected in an anti-parallel configuration. The damping mechanism or method then involves connecting the at least one pair of diodes between a neutral connection of the medium voltage or high voltage transformer and ground potential.

In an example, the at least one pair of diodes is configured to block a DC voltage.

In an example, the at least one pair of diodes is configured to reduce or eliminate a DC current.

In an example, the DC current damper is configured to block a DC current in the range 100 mA—a few Amps.

In an example, the DC current damper is configured to block the DC current up to any one of: 2 A; 3 A; 5 A; 7 A; and 10 A.

In an example, the at least one pair of diodes comprises a plurality of pairs of diodes.

In an example, the method comprises cascading the plurality of pairs of diodes in series.

In an example, the method comprises connecting the plurality of pairs of diodes in series.

In an example, each pair of diodes is configured to have a threshold voltage of the order of 0.5-1.2V.

In an example, each pair of diodes is configured to have a threshold voltage of 0.8V.

Figure 2:
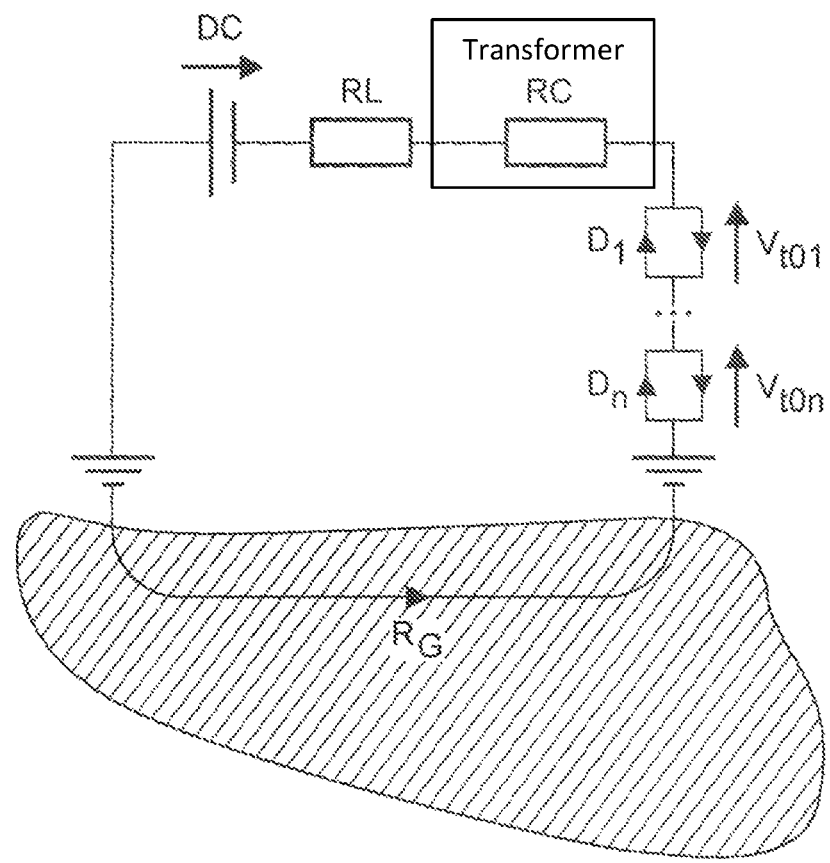
FIG. 2 shows a schematic representation of a DC current damper provided within the representation shown in FIG. 1.

The DC current damper, and it utilization, are now described in further specific detail, where reference is made to FIGS. 1-2.

As discussed above, DC current can cause losses and increased noise in electrical equipment such as a medium voltage or high voltage transformer. Such DC currents are often in the range of a few 100 mA up to a few A. The DC current damper described here reduces or eliminates small DC currents, which are typical in AC transmission and distribution grids.

As shown in FIG. 1, the DC current is driven by rather low voltages, $U_{DC}$, as the DC resistance in the grid is small as well. The DC resistance is the sum of the Line resistance+ coil resistance+ground resistance. The DC current in this simple circuit $$I_{DC}=U_{DC}/(R_L+R_C+R_G)$$

$I_{DC}$=DC Current in the circuit
$U_{DC}$=DC Voltage
$R_L$=Line resistance
$R_C$=Coil resistance
$R_G$=Ground resistance As shown in FIG. 2, the DC current damper described here uses diodes between the neutral and ground connection, where those diodes are in anti-parallel connection. The threshold voltage, $V_{to}$, of such a power diode in in the range of 0.8 V. This means that any voltage would be blocked by the diode. Thus, a pair of diodes are connected anti-parallel and connected between neutral of the transformer and ground potential, where a first pair of ant-parallel diodes is termed $D_1$, as shown in FIG. 2. However, the diodes can be cascaded, in order to reach multiple times the threshold voltage, $V_{to}$, where now there can be n pairs of anti-parallel connected diodes: $D_1$-$D_n$, as shown in FIG. 2. The effect is that a small $U_{DC}$ will be blocked, and therefore no DC current will saturate the core up to the threshold voltage or a multiple thereof due to the cascaded diode pairs $D_1$-$D_n$. If the neutral becomes loaded, the voltage will raise and the diodes will carry the current. There is therefore no limiting effect expected during load or even short circuit.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. The mere fact that certain measures are re-cited in mutually different dependent claims does not indicate that a combination of these measures cannot be used to advantage.

The invention claimed is:

1. A DC current damper for a medium voltage or high voltage transformer, the DC current damper comprising:
   at least one pair of diodes;
   wherein, the two diodes in each pair of diodes are connected in an anti-parallel configuration; and
   wherein the at least one pair of diodes is configured to be connected between a connection of a medium voltage or high voltage transformer and ground potential,
   wherein the DC current damper is configured to block a DC current in the range 100 mA-2 Amps.

2. The DC current damper according to claim 1, wherein the at least one pair of diodes is configured to block a DC voltage.

3. The DC current damper according to claim 1, wherein the at least one pair of diodes is configured to reduce or eliminate a DC current.

4. The DC current damper according to claim 1, wherein the DC current damper is configured to block the DC current up to any one of: 2 A, 3 A, and 5 A.

5. The DC current damper according to claim 1, wherein the at least one pair of diodes comprises a plurality of pairs of diodes.

6. The DC current damper according to claim 5, wherein the plurality of pairs of diodes are cascaded.

7. The DC current damper according to claim 5, wherein the plurality of pairs of diodes are connected in series.

8. The DC current damper according to claim 1, wherein each pair of diodes is configured to have a threshold voltage of the order of 0.5-1.2V.

9. The DC current damper according to claim 8, wherein each pair of diodes is configured to have a threshold voltage of 0.8V.

10. A medium voltage or high voltage transformer comprising a DC current damper according to claim 1.

11. A medium voltage or high voltage switchgear comprising a DC current damper according to claim 1.

12. A medium voltage or high voltage switchgear comprising a medium voltage or high voltage transformer according to claim 10.

13. A method of damping current with a DC current damper for a medium voltage or high voltage transformer, the DC current damper comprising at least one pair of diodes, wherein the two diodes in each of the at least one pair of diodes are connected in an anti-parallel configuration; and wherein the method comprises connecting the at least one pair of diodes between a connection of the medium voltage or high voltage transformer and a ground potential,
   wherein the DC current damper is configured to block a DC current in a range 100 mA-10 Amps.

14. A DC current damper for a medium voltage or high voltage transformer, the DC current damper comprising:
   a plurality of diode pairs that are connected in series with one another to provide a series of diode pairs, each of the plurality of diode pairs comprising a first diode and a second diode that is connected in anti-parallel with the first diode, wherein the series of diode pairs is connected to a connection of a medium voltage or high voltage transformer and a ground potential,
   wherein the DC current damper is configured to block a DC current in a range 100 mA-10 Amps.

15. The DC current damper according to claim 14 wherein the series of diode pairs is configured to block a DC voltage and to reduce a DC current.

16. The DC current damper according to claim 14, wherein the DC current damper is configured to block the DC current up to any one of: 2 A, 3 A, 5 A and 7 A.

17. The DC current damper according to claim 14 wherein the plurality of diode pairs are cascaded.

18. The DC current damper according to claim 14, wherein each of the plurality of diode pairs is configured to have a threshold voltage in a range from about 0.5V to about 1.2V.

* * * * *